(12) United States Patent
Lee

(10) Patent No.: US 12,014,703 B2
(45) Date of Patent: Jun. 18, 2024

(54) ELECTRONIC DEVICE AND OPERATION METHOD OF ELECTRONIC DEVICE FOR CONTROLLING SCREEN DISPLAY

(71) Applicant: SAMSUNG ELECTRONICS CO., LTD., Suwon-si (KR)

(72) Inventor: Yongha Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/116,631

(22) Filed: Mar. 2, 2023

(65) Prior Publication Data
US 2023/0245632 A1 Aug. 3, 2023

Related U.S. Application Data

(63) Continuation of application No. PCT/KR2023/001168, filed on Jan. 26, 2023.

(30) Foreign Application Priority Data

Jan. 28, 2022 (KR) .................. 10-2022-0013652
Feb. 15, 2022 (KR) .................. 10-2022-0019638

(51) Int. Cl.
*G09G 5/10* (2006.01)
*G09G 5/12* (2006.01)
*H04N 5/45* (2011.01)

(52) U.S. Cl.
CPC .......... *G09G 5/10* (2013.01); *G09G 5/12* (2013.01); *H04N 5/45* (2013.01); *G09G 2320/0626* (2013.01)

(58) Field of Classification Search
None
See application file for complete search history.

(56) References Cited

U.S. PATENT DOCUMENTS 9,338,269 B1 * 5/2016 Nelissen .............. G09G 3/3406
11,036,384 B2 * 6/2021 Yoon .................... G06F 3/0485
2004/0257316 A1 12/2004 Nguyen
(Continued)

FOREIGN PATENT DOCUMENTS

JP 2021-092626 6/2021
KR 10-2000-0050020 8/2000
(Continued)

OTHER PUBLICATIONS

International Search Report and Written Opinion dated Apr. 26, 2023 issued in International Application No. PCT/KR2023/001168 with English translation (9 pages).

*Primary Examiner* — Stephen T. Reed
(74) *Attorney, Agent, or Firm* — Nixon & Vanderhye, P.C.

(57) ABSTRACT

An electronic device according to various embodiments may include: a display, and a processor, in which the processor is configured to: identify a first area of a screen in which a video is played, produce a first frame corresponding to the first area, produce a second frame corresponding to a second area different from the first area, determine a lightness of the second frame based on an input factor related to a state of the electronic device, synthesize the first frame having an unchanged lightness and the second frame having a changed and determined lightness, and control the display to display the synthesized frame on the display.

20 Claims, 13 Drawing Sheets

(56) References Cited

U.S. PATENT DOCUMENTS

| | | |
|---|---|---|
| 2006/0087502 A1 | 4/2006 | Karidis et al. |
| 2011/0148906 A1 | 6/2011 | Jeong et al. |
| 2013/0120447 A1 | 5/2013 | Kim et al. |
| 2015/0039996 A1* | 2/2015 | Kwon .................. G06F 40/143 715/234 |
| 2015/0046823 A1* | 2/2015 | Didomenico ............ G09G 5/14 715/722 |
| 2015/0294627 A1 | 10/2015 | Yoo et al. |
| 2016/0142760 A1 | 5/2016 | Son |
| 2016/0203749 A1 | 7/2016 | Steyskal et al. |
| 2017/0235442 A1 | 8/2017 | Jung et al. |
| 2017/0295343 A1* | 10/2017 | Konishi ............... G09G 3/2096 |

FOREIGN PATENT DOCUMENTS

| | | |
|---|---|---|
| KR | 10-2002-0043523 | 6/2002 |
| KR | 10-2003-0096146 | 12/2003 |
| KR | 10-2004-0038411 A | 5/2004 |
| KR | 10-2004-0046555 | 6/2004 |
| KR | 10-2005-0014331 | 2/2005 |
| KR | 10-2006-0007623 | 1/2006 |
| KR | 10-2006-0058878 | 6/2006 |
| KR | 10-2006-0082691 | 7/2006 |
| KR | 10-2006-0132365 A | 12/2006 |
| KR | 10-0848147 | 2/2007 |
| KR | 10-2007-0044265 | 4/2007 |
| KR | 10-0724708 | 5/2007 |
| KR | 10-2007-0073329 | 7/2007 |
| KR | 10-2007-0076285 | 7/2007 |
| KR | 10-2008-0069412 | 7/2008 |
| KR | 10-0844340 | 7/2008 |
| KR | 10-2009-0039155 | 4/2009 |
| KR | 10-2009-0040485 | 4/2009 |
| KR | 10-2009-0055544 | 6/2009 |
| KR | 10-2009-0091935 | 8/2009 |
| KR | 10-2010-0026152 | 3/2010 |
| KR | 10-2010-0054464 | 5/2010 |
| KR | 10-2010-0072681 A | 7/2010 |
| KR | 10-2010-0084707 | 7/2010 |
| KR | 10-2010-0138554 | 12/2010 |
| KR | 10-2011-0057279 | 6/2011 |
| KR | 10-2011-0072000 | 6/2011 |
| KR | 10-1072405 | 10/2011 |
| KR | 10-2012-0067421 | 6/2012 |
| KR | 10-2012-0076828 | 7/2012 |
| KR | 10-2012-0094535 | 8/2012 |
| KR | 10-2012-0097126 | 9/2012 |
| KR | 10-2013-0044458 | 5/2013 |
| KR | 10-2013-0054071 | 5/2013 |
| KR | 10-1278009 | 6/2013 |
| KR | 10-1299670 | 8/2013 |
| KR | 10-1365219 | 2/2014 |
| KR | 10-2014-0050772 | 4/2014 |
| KR | 10-2015-0002193 | 1/2015 |
| KR | 10-2015-0057339 | 5/2015 |
| KR | 10-2015-0069242 | 6/2015 |
| KR | 10-2015-0113804 | 10/2015 |
| KR | 10-2015-0116499 | 10/2015 |
| KR | 2015-0118721 | 10/2015 |
| KR | 10-1596793 | 2/2016 |
| KR | 10-2016-0036602 A | 4/2016 |
| KR | 10-1643720 | 7/2016 |
| KR | 10-2017-0059798 | 5/2017 |
| KR | 10-1732468 B1 | 5/2017 |
| KR | 10-2017-0065915 | 6/2017 |
| KR | 10-2017-0082410 | 7/2017 |
| KR | 10-2017-0096364 | 8/2017 |
| KR | 10-2017-0096436 | 8/2017 |
| KR | 10-1801037 | 11/2017 |
| KR | 10-2018-0075452 | 7/2018 |
| KR | 10-1906990 | 10/2018 |
| KR | 10-2018-0130767 | 12/2018 |
| KR | 10-2018-0132385 | 12/2018 |
| KR | 10-2019-0059465 | 5/2019 |
| KR | 10-2019-0122082 | 10/2019 |
| KR | 10-2020-0009412 | 1/2020 |
| KR | 10-2020-0112020 | 10/2020 |
| KR | 10-2194409 | 12/2020 |

\* cited by examiner

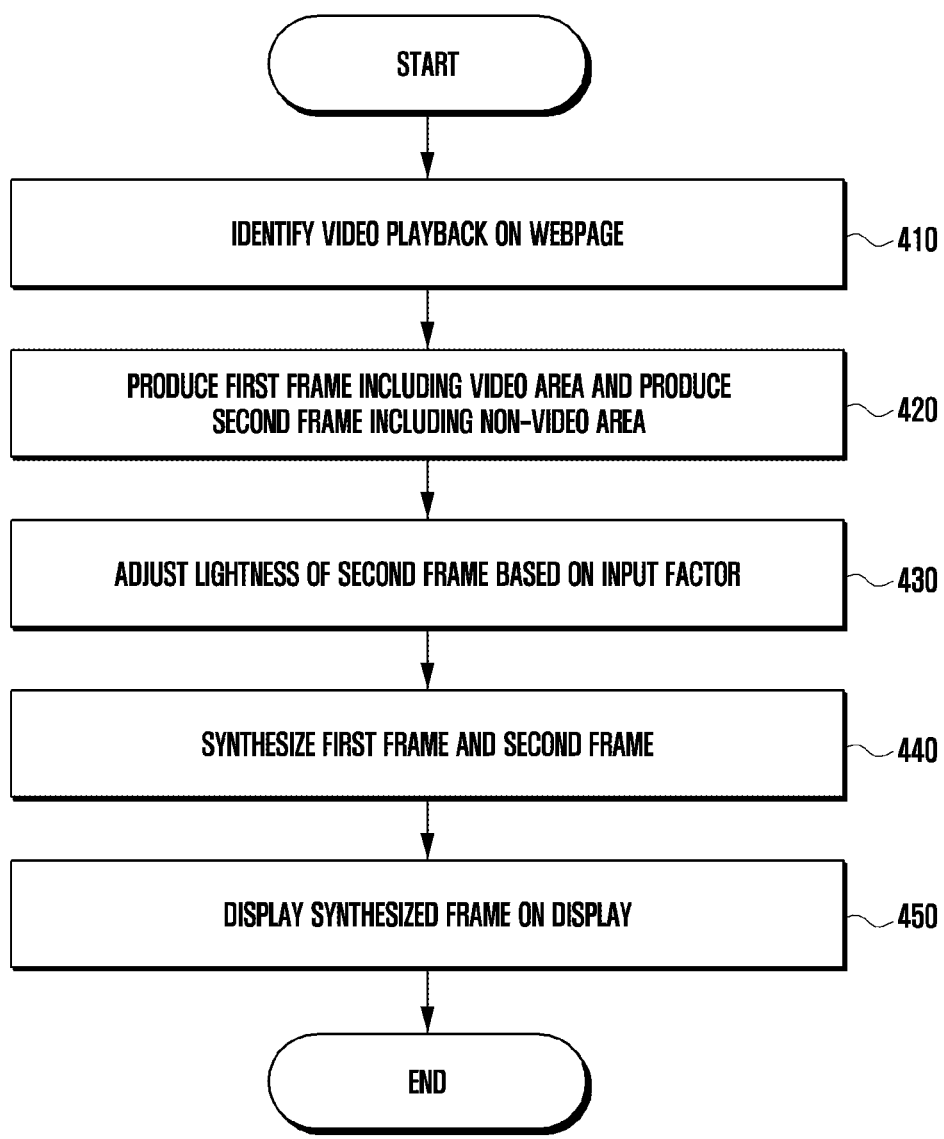

FIG. 6B
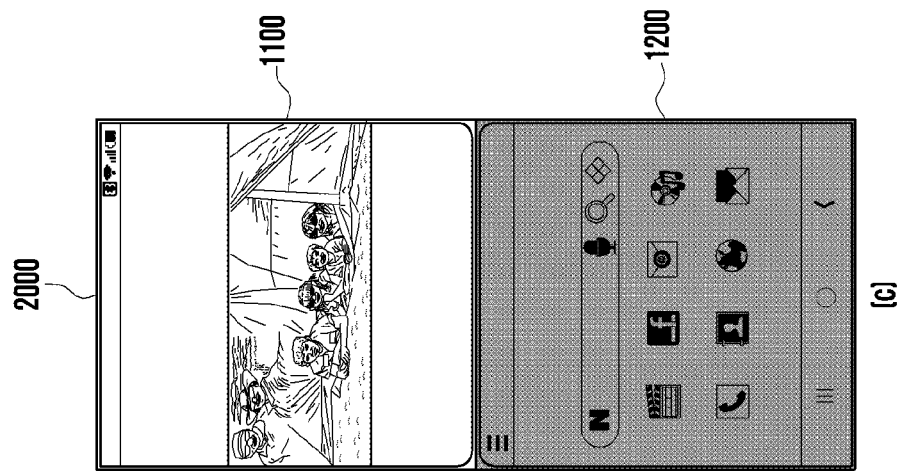
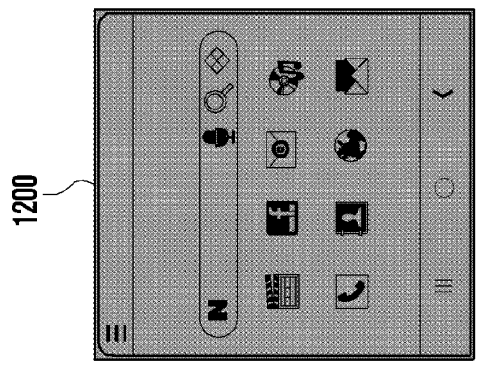
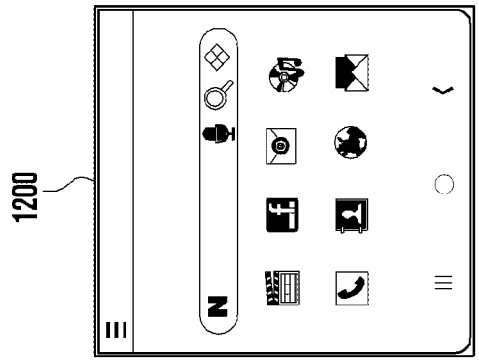

ELECTRONIC DEVICE AND OPERATION METHOD OF ELECTRONIC DEVICE FOR CONTROLLING SCREEN DISPLAY

CROSS-REFERENCE TO RELATED APPLICATIONS

This application is a continuation of International Application No. PCT/KR2023/001168 designating the United States, filed on Jan. 26, 2023, in the Korean Intellectual Property Receiving Office and claiming priority to Korean Patent Application No. 10-2022-0013652, filed on Jan. 28, 2022, in the Korean Intellectual Property Office, and to Korean Patent Application No. 10-2022-0019638, filed on Feb. 15, 2022, in the Korean Intellectual Property Office, the disclosures of all of which are incorporated by reference herein in their entireties.

BACKGROUND

Field

The disclosure relates to an electronic device and an operation method of the electronic device for controlling screen display. For example, the disclosure relates to an electronic device for displaying a webpage on a screen and an operation method of the electronic device.

Description of Related Art

As the performance of an electronic device is improved, the recent electronic device does not provide only a single function. For example, a portable terminal such as a smartphone provides various numerous functions such as multimedia players, e-book readers, document editors, and game devices.

For example, in the case of an electronic device such as a portable terminal, as the performance is improved and the resolution of the display screen increases, the use of web browsing using the portable terminal becomes common. When a user requests a connection to a specific webpage, the HTML code on the requested web page is parsed, and then the content of the webpage may be displayed to correspond to the parsing results. The webpage may include a variety of multimedia content, such as article content, video content, or image content.

When a user requests a connection to a webpage including a video, the electronic device displays the webpage including the video. In this case, a user generally focuses on information in a video area on the webpage and may be less interested in information in an area other than the video.

Meanwhile, because of the characteristics of an AMOLED that is a mobile display, a relatively larger amount of current may be consumed to express a white screen than a dark screen.

SUMMARY

Embodiments of the disclosure provide an electronic device that may control lightness for each area of a webpage when processing (e.g., displaying) the webpage including multimedia content such as video content.

An electronic device according to various example embodiments disclosed herein may include: a display; and a processor, wherein the processor is configured to: identify a first area of a screen in which a video is played, produce a first frame corresponding to the first area, produce a second frame corresponding to a second area different from the first area, determine lightness of the second frame based on an input factor related to a state of the electronic device, synthesize the first frame having unchanged lightness and the second frame having changed and determined lightness, and control the display to display the synthesized frame on the display.

An example method of operating an electronic device according to various embodiments disclosed herein may include: identifying a first area of a screen in which a video is played; producing a first frame corresponding to the first area; producing a second frame corresponding to a second area different from the first area; determining lightness of the second frame based on an input factor related to a state of the electronic device; synthesizing the first frame and the second frame; and displaying the synthesized frame on a display.

According to various example embodiments of the present disclosure, the electronic device may reduce the current consumption by controlling the lightness of the area of the screen that the user is less interested in.

According to various example embodiments of the present disclosure, the electronic device may control the lightness in an area that is not an area on the screen in which the user is very interested, thereby providing an environment that enables the user to focus on the content in the area in which the user is interested.

According to various example embodiments of the present disclosure, the electronic device may control brightness of the screen of the browser engine without controlling brightness of the display module.

According to various example embodiments of the present disclosure, the electronic device may provide a lightness adjustment function according to the user's situation when controlling the lightness in consideration of webpage content, whether to fix screen brightness setting, external brightness, and/or a battery level.

BRIEF DESCRIPTION OF THE DRAWINGS

In connection with the description of the drawings, the same or similar reference numerals may be used for the same or similar components. Further, the above and other aspects, features and advantages of certain embodiments of the present disclosure will be more apparent from the following detailed description, taken in conjunction with the accompanying drawings, in which:

FIG. 4 is a flowchart illustrating an example method of adjusting and displaying lightness of a frame corresponding to a non-video area when a processor plays a video on a webpage according to various embodiments;

FIG. 6B is a diagram illustrating an example in which the processor produces and synthesizes the frames and displays the synthesized frame on the display when playing the video in the multiwindow according to various embodiments;

DETAILED DESCRIPTION

Figure 1:
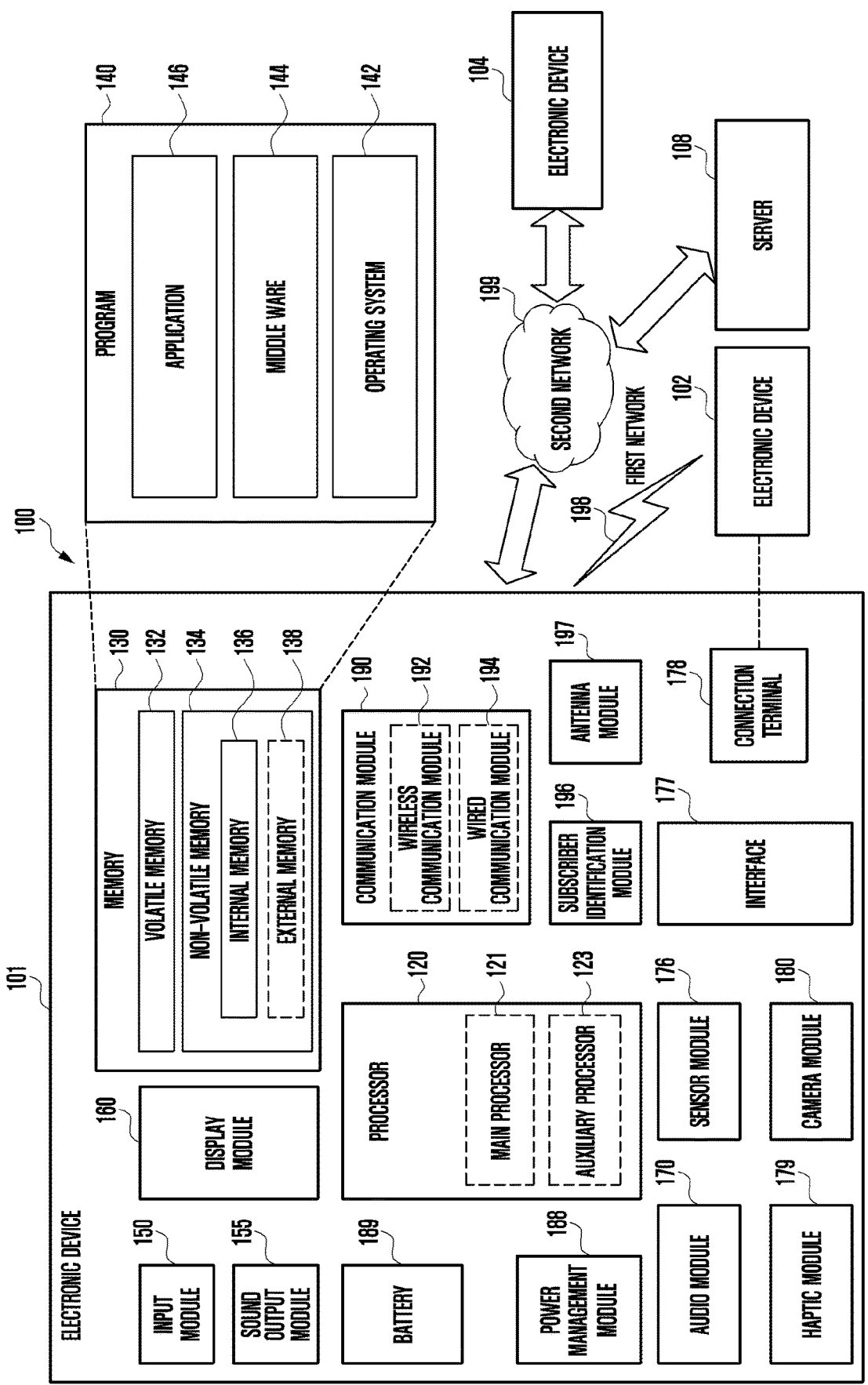
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
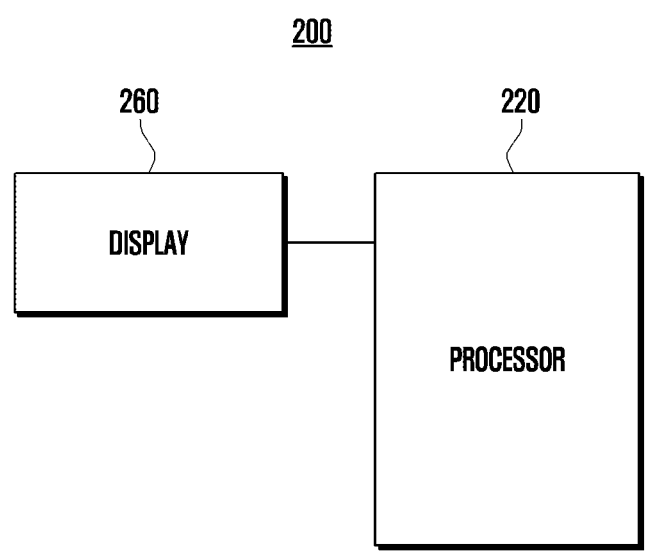
FIG. 2 is a block diagram illustrating an example configuration of the electronic device according to various embodiments.

FIG. 2 is a block diagram illustrating an example configuration of the electronic device according to various embodiments.

With reference to FIG. 2, an electronic device 200 (e.g., the electronic device 101 in FIG. 1) may include a processor (e.g., including processing circuitry) 220 (e.g., the processor 120 in FIG. 1) and/or a display (e.g., including a display panel) 260 (e.g., the display 160 in FIG. 1). The elements included in FIG. 2 are some of the elements included in the electronic device 200, and the electronic device 200 may include various elements illustrated in FIG. 1 in addition to the elements.

The processor 220 according to various embodiments may include various processing circuitry and produce and synthesize frames when playing a video on a webpage.

According to an embodiment, the processor 220 may identify a video playback in a partial area of a screen. For example, the processor 220 may identify that the video is played in a first area of the screen. For example, the processor 220 may identify that a video is played on a webpage 1000. For example, the processor 220 may identify that a video is played in at least one window of a multiwindow. For example, the processor 220 may identify that a video is played in a PIP (picture-in-picture) window.

According to an embodiment, the processor 220 may produce a first frame (e.g., a first frame 1100 in FIG. 3) including a video area (e.g., the first area), and a second frame (e.g., a second frame 1200 in FIG. 3) including a non-video area (e.g., a second area). For example, the video area may be the first area including a video, and the non-video area may be a second area excluding an area including a video.

According to an embodiment, the processor 220 may produce the first frame 1100 in respect to the first area. For example, the processor 220 may produce a WebMediaPlayer (e.g., a WebMediaPlayer 330 in FIG. 3) based on video information in respect to the first area. For example, the processor 220 may receive video data from a server and process the video data using a video URL. For example, the processor 220 may decode the video data using a video codec and an audio codec. For example, the processor 220 may produce the first frame 1100 based on the decoded video data.

According to an embodiment, the processor 220 may produce the second frame 1200 in respect to the non-video area. For example, the non-video area may be another area on the webpage 1000 that excludes the area including the video. As another example, the non-video area may be a window of the multiwindow that does not play a video. As yet another example, the non-video area may be a window that excludes a video PIP.

According to an embodiment, the processor 220 may adjust the lightness of the second frame 1200 based on an input factor. For example, the input factor may include at least one of webpage content, information indicating whether to enter a mode for maintaining screen brightness, information indicating external brightness, and a battery level.

According to an embodiment, the characteristics (e.g., the lightness) of the first frame 1100 may be maintained.

Figure 3:
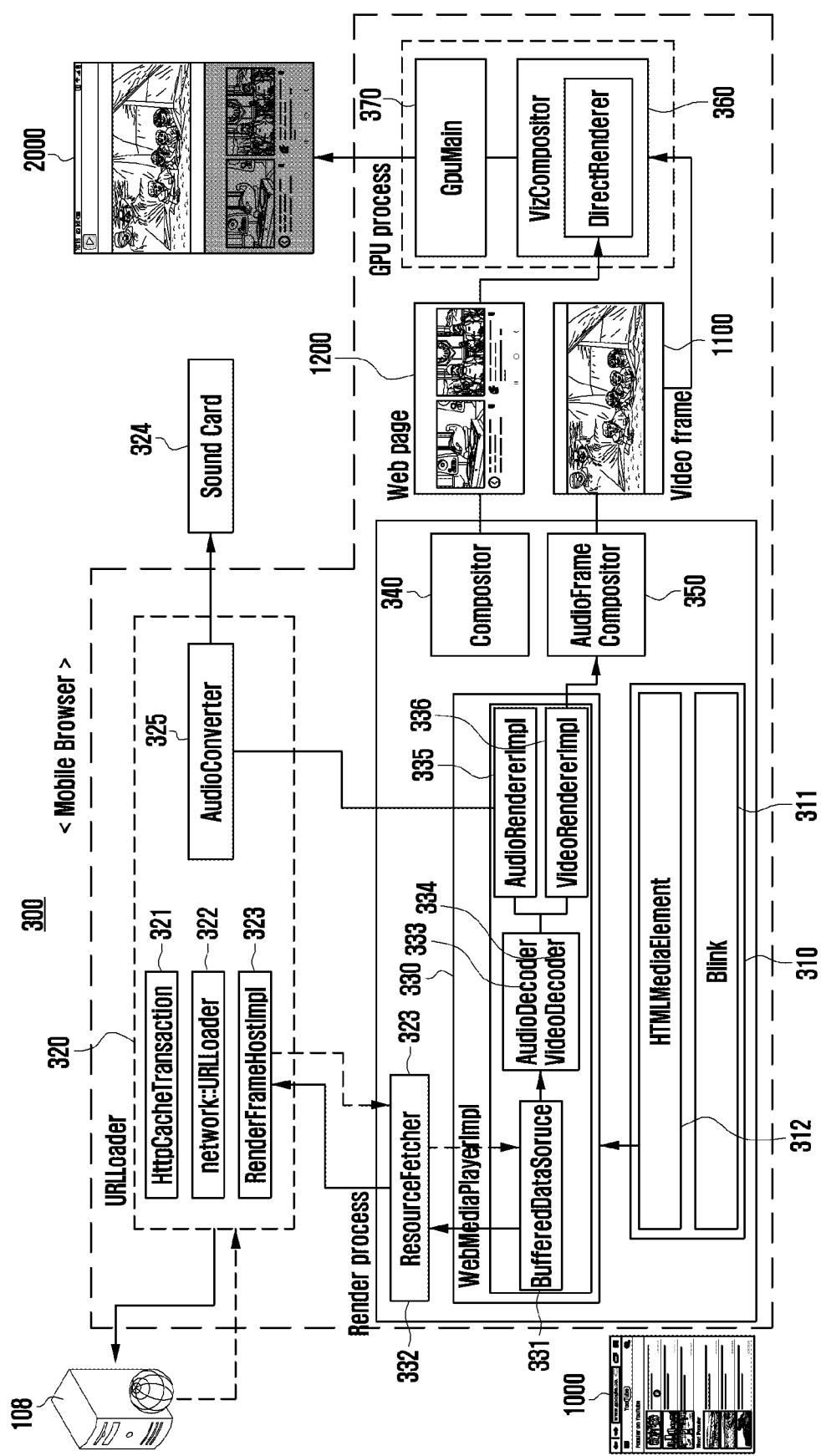
FIG. 3 is a diagram illustrating an example configuration of a browser engine of the electronic device according to various embodiments.

According to an embodiment, the processor 220 may adjust the lightness of the second frame 1200 by means of a VisCompositor module (e.g., a VizCompositor 360 in FIG. 3).

According to an embodiment, the processor 220 may adjust the lightness of the second frame 1200 by means of the VisCompositor module (e.g., the VizCompositor 360 in FIG. 3) while maintaining backlight brightness of the display 260.

According to an embodiment, the processor 220 may adjust the lightness of the second frame 1200 by adjusting the backlight brightness of the display 260 in the area of the second frame 1200.

According to an embodiment, the processor 220 may synthesize the first frame 1100 having the unchanged lightness and the second frame 1200 having the changed and determined lightness.

For example, the processor 220 may synthesize the first frame 1100 and the second frame 1200 with the adjusted lightness. For example, the processor 220 may synthesize the first frame 1100 and the second frame 1200 using an openGL command.

According to an embodiment, the processor 220 may display a synthesized frame 2000 on the display 260. According to various embodiments, the display 260 may display the frame produced and synthesized by the processor 220.

FIG. 3 is a diagram illustrating an example configuration of a browser engine 300 of the electronic device according to various embodiments.

The browser engine 300 may include a software module and may be operated by the processor 220 in FIG. 2.

According to various embodiments, the browser engine 300 may load a webpage by acquiring objects from a server 108 and include a Dom Tree 310, an URLLoader 320, a WebMediaPlayer 330, a compositor 340, a VideoFrameCompositor 350, a Vizcompositor 360, and/or a GpuMain 370.

According to various embodiments, the Dom Tree 310 may be one of the data structures of the browser engine 300 and a data structure for efficiently approaching HTML, XML objects, and the like of the webpage.

According to an embodiment, a Blink engine 311 may be an engine for forming the webpage 1000. The Blink engine 311 may identify that the user selects a link on the webpage 1000.

According to an embodiment, an HTMLMediaElement 312 may request the production of the WebMediaPlayer 330 on the webpage 1000 while corresponding to the situation in which the user selects a link including a video tag in the webpage 1000.

According to various embodiments, the URLLoader 320 may communicate with the server 108, request data, and acquire the requested data from the server 108.

According to an embodiment, the URLLoader 320 may acquire data from the server 108 through a browser process based on a URL address of the link including the video tag. For example, a browser process may be a process of requesting and acquiring a series of required data while communicating with the server 108.

According to an embodiment, based on the URL address of the link including the video tag, the URLLoader 320 may request the data related to the video to the server 108 and acquire the data from the server 108. For example, the data related to the video may include raw audio data and/or raw video data.

According to various embodiments, the WebMediaPlayer 330 may be a module for operating a render process related to the video to play the video. For example, the render process may be a process of performing rendering on the video area and/or the non-video area included in the webpage.

According to an embodiment, the WebMediaPlayer 330 may transmit a video URL, which corresponds to the link including the video tag, to the URLLoader 320 through a ResourceFetcher 332 using a BufferedDataSource 331. The WebMediaPlayer 330 may acquire data required for a browser page from the URLLoader 320 through the ResourceFetcher 332.

According to an embodiment, the WebMediaPlayer 330 may decode raw audio data of the video using an AudioDecoder 333, decode raw video data of the video using a VideoDecoder 334, and convert the decoded data into data that the GpuMain may play.

According to an embodiment, an AudioRenderlmpl 335 may transmit the decoded audio data to through Audio Converter 325 a sound card 324 and output the audio data through a speaker (e.g., the sound output module 155 in FIG. 1).

According to an embodiment, a VideoRenderlmpl 336 may transmit the video data, which are decoded by the VideoDecoder 334, to the VideoFrameCompositor 350.

According to various embodiments, the compositor 340 may form the webpage area (e.g., the second area) corresponding to the area other than the video area on the webpage. For example, the first area may be an area including a video, and the second area may be another area excluding the area including the video. For example, the compositor 340 may produce the second frame 1200 in respect to the second area.

According to various embodiments, the VideoFrameCompositor 350 may form the webpage area corresponding to the first area on the webpage. For example, the VideoFrameCompositor 350 may produce the first frame 1100 corresponding to the first area.

According to various embodiments, the Vizcompositor 360 may adjust the lightness of the first frame 1100 produced by the VideoFrameCompositor 350 and/or the lightness of the second frame 1200 produced by the compositor 340 and synthesize the first frame 1100 and the second frame 1200. For example, a DirectRenderer of the Vizcompositor 360 may synthesize the first frame 1100 and the second frame 1200 with the adjusted lightness into a single frame. For example, the Vizcompositor 360 may adjust the lightness of the first frame 1100 and/or the lightness of the second frame 1200 based on the input factor such as webpage content, screen brightness setting, external brightness, and/or a battery level. For example, the Vizcompositor 360 may synthesize the first frame 1100 and the second frame 1200 using the openGL command.

According to various embodiments, the GpuMain 370 may display the synthesized frame 2000 on the display (e.g., the display 260 in FIG. 2).

FIG. 4 is a flowchart illustrating an example method of adjusting and displaying the lightness of the frame corresponding to the non-video area when the processor (e.g., the processor 220 in FIG. 2) plays a video in an area of a webpage on the screen according to various embodiments.

According to various embodiments, in operation 410, the processor 220 may identify a video playback in a partial area of the screen that displays the webpage.

According to an embodiment, the processor 220 may identify that the video is played on the webpage 1000.

According to an embodiment, the processor 220 may identify that the video is played in at least one window of the multiwindow.

According to an embodiment, the processor 220 may identify that the video is played in the PIP (picture-in-picture) window.

According to various embodiments, in operation 420, the processor 220 may produce the first frame (e.g., the first frame 1100 in FIG. 3) including the first area and produce the second frame (e.g., the second frame 1200 in FIG. 3) including the second area including the non-video area. For example, the first area may be an area including a video, and the second area may be another area excluding the area including the video.

According to an embodiment, the processor 220 may produce the first frame 1100 in respect to the first area. For example, the processor 220 may produce the WebMediaPlayer (e.g., the WebMediaPlayer 330 in FIG. 3) based on video information in respect to the first area. For example, the processor 220 may receive video data from the server and process the video data using the video URL. For example, the processor 220 may convert the video data by the video codec and/or the audio codec. For example, the processor 220 may produce the first frame 1100 based on the decoded video data.

According to an embodiment, the processor 220 may produce the second frame 1200 in respect to the second area. The second area may be another area on the webpage 1000 that excludes the area including the video. The second area may be a window of the multiwindow that does not play a video. The second area may be a window that excludes the video PIP.

According to various embodiments, in operation 430, the processor 220 may adjust the lightness of the second frame 1200 based on the input factor.

According to an embodiment, the input factor may include at least one of webpage content, information indicating whether to enter a mode for maintaining screen brightness, information indicating external brightness, and a battery level.

According to an embodiment, the characteristics (e.g., the lightness) of the first frame 1100 may be maintained.

According to an embodiment, the processor 220 may adjust the lightness of the second frame 1200 by means of the VisCompositor module (e.g., the VizCompositor 360 in FIG. 3).

According to an embodiment, the processor 220 may adjust the lightness of the second frame 1200 by means of the VisCompositor module 360 while maintaining backlight brightness of the display 260.

According to an embodiment, the processor 220 may adjust the lightness of the second frame 1200 by adjusting the backlight brightness of the display 260 in the area of the second frame 1200.

According to various embodiments, in operation 440, the processor 220 may synthesize the first frame 1100 having the unchanged lightness and the second frame 1200 having the changed and determined lightness.

For example, the processor 220 may synthesize the first frame 1100 and the second frame 1200 with the adjusted lightness. For example, the processor 220 may synthesize the first frame 1100 and the second frame 1200 using the openGL command.

According to various embodiments, in operation 450, the processor 220 may display the synthesized frame 2000 on the display 260.

Figure 5A:
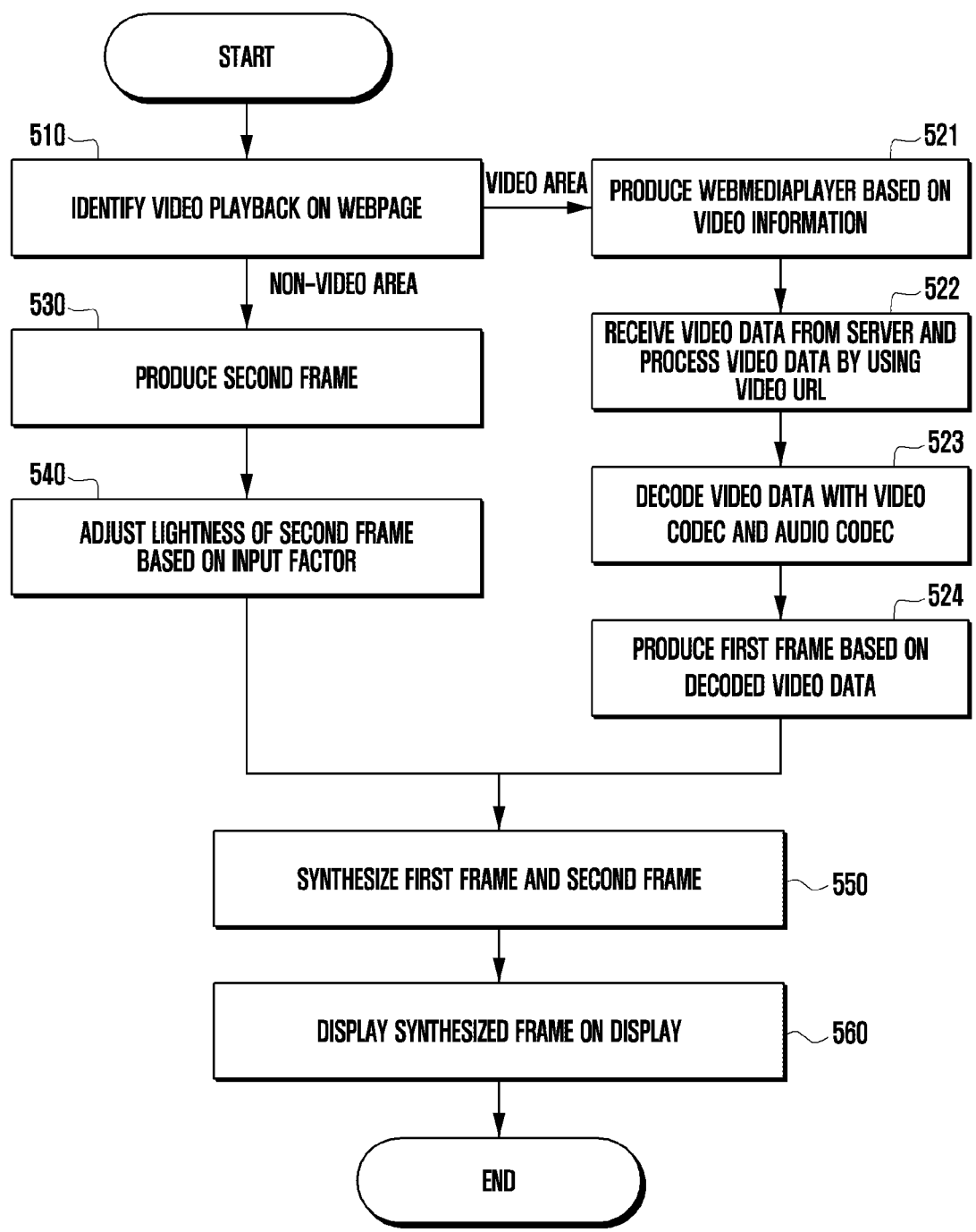
FIG. 5A is a flowchart illustrating an example method of producing, synthesizing, and displaying frames when the processor plays a video on a webpage according to various embodiments.

FIG. 5A is a flowchart illustrating an example method of producing, synthesizing, and displaying frames when the processor (e.g., the processor 220 in FIG. 2) plays a video on a webpage according to various embodiments.

An operation in FIG. 5A according to various embodiments may be an operation performed by the processor 220 using the module included in the browser engine 300 illustrated in FIG. 3.

According to various embodiments, in operation 510, the processor 220 may identify that the video is played on the webpage 1000.

For example, the processor 220 may identify that the user selects a link including a video on the webpage 1000.

According to various embodiments, in operation 521, the processor 220 may produce the WebMediaPlayer 330 based on video information in respect to the first area. The first area may be an area including a video, and the second area may be another area excluding the area including the video.

According to an embodiment, the processor 220 may produce the WebMediaPlayer 330 on the webpage 1000 while corresponding to the situation in which the user selects a link including a video tag in the webpage 1000.

According to various embodiments, in operation 522, the processor 220 may receive the video data from the server (e.g., the server 108 in FIG. 1) and process the video data using the video URL.

According to an embodiment, based on the URL address of the link including the video tag, the processor 220 may request the data related to the video to the server 108 and acquire the data from the server 108. For example, the data related to the video may include raw audio data and/or raw video data.

According to various embodiments, in operation 523, the processor 220 may convert (e.g., decode) the video data by the video codec and/or the audio codec.

According to an embodiment, the processor 220 may decode the raw audio data of the video using the AudioDecoder (e.g., the AudioDecoder 333 in FIG. 3), decode the raw video data of the video using the VideoDecoder (e.g., the VedioDecoder 334 in FIG. 3), and convert the decoded data into video data that the GpuMain (e.g., the GpuMain in FIG. 3) may play.

According to various embodiments, in operation 524, the processor 220 may produce the first frame (e.g., the first frame 1100 in FIG. 3) based on the decoded video data.

According to various embodiments, in operation 530, the processor 220 may produce the second frame (e.g., the second frame 1200 in FIG. 3) in respect to the non-video area. The first area may be an area of the webpage including a video, and the second area may be another area of the webpage not including the area including the video.

According to various embodiments, in operation 540, the processor 220 may adjust the lightness of the second frame 1200 based on the input factor.

According to an embodiment, the characteristics (e.g., the lightness) of the first frame 1100 may be maintained.

According to an embodiment, the processor 220 may adjust the lightness of the second frame 1200 by means of the VisCompositor module (e.g., the VizCompositor 360 in FIG. 3).

According to an embodiment, the processor 220 may adjust the lightness of the second frame 1200 by means of the VisCompositor module 360 while maintaining backlight brightness of the display 260.

According to an embodiment, the processor 220 may adjust the lightness of the second frame 1200 by adjusting the backlight brightness of the display 260 in the area of the second frame 1200.

According to an embodiment, the processor 220 may adjust the lightness of the second frame 1200 based on at least one of webpage content, screen brightness setting, external brightness, and a battery level.

A detailed description of operation 540 will be described in greater detail below with reference to FIG. 8.

According to various embodiments, in operation 550, the processor 220 may synthesize the first frame 1100 having the unchanged lightness and the second frame 1200 having the changed and determined lightness.

According to various embodiments, the processor 220 may synthesize the first frame 1100 and the second frame 1200 with the adjusted lightness. For example, the processor 220 may synthesize the first frame 1100 and the second frame 1200 using the openGL command.

According to various embodiments, in operation 560, the processor 220 may display the synthesized frame 2000 on the display 260.

Figure 5B:
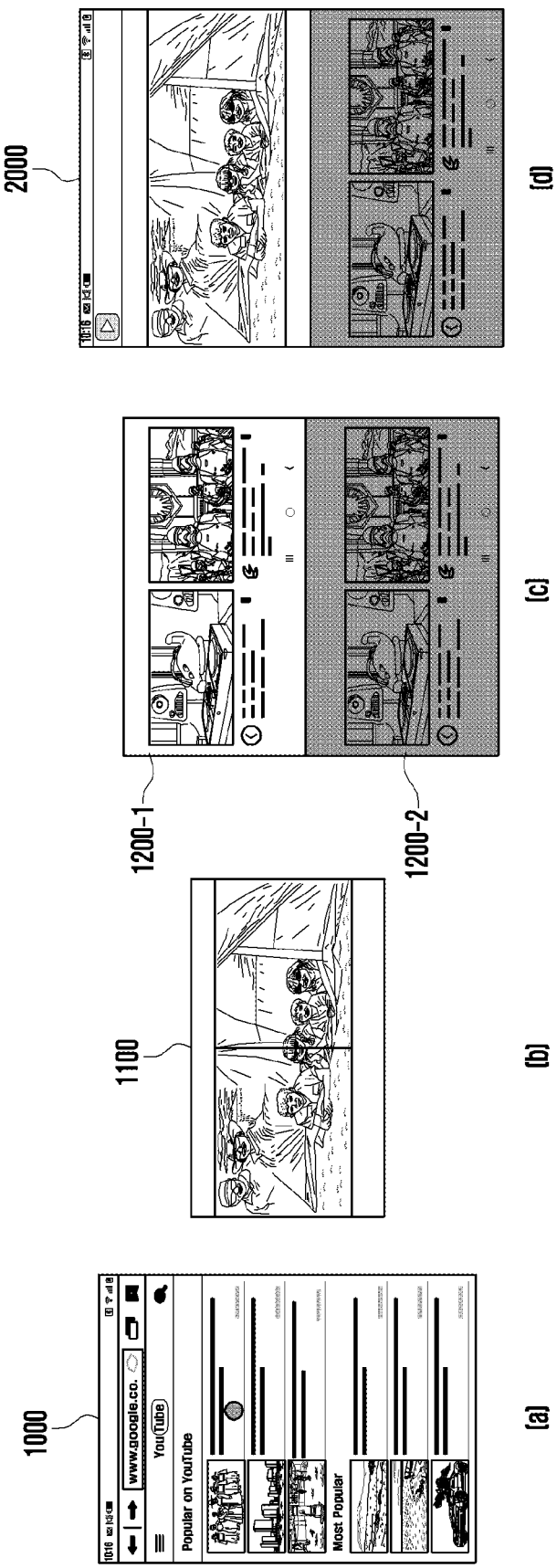
FIG. 5B is a diagram illustrating an example in which the processor produces and synthesizes the frames and displays the synthesized frame on a display when playing the video on the webpage according to various embodiments.

FIG. 5B is a diagram illustrating an example in which the processor 200 produces and synthesizes the frames and displays the synthesized frame on the display when playing the video on the webpage according to various embodiments.

With reference to FIG. 5B (a), the processor 220 may identify that the user selects the link including the video on the webpage 1000 in accordance with operation 510 in FIG. 5A.

With reference to FIG. 5B (b), the processor 220 may produce the first frame 1100 corresponding to the video area (e.g., the first area) while corresponding to the situation in which the user selects the link including the video tag in the webpage 1000 in accordance with operations 521 to 524 in FIG. 5A.

With reference to FIG. 5B (c), the processor 220 may produce a second frame 1200-1 in respect to the non-video area in accordance with operation 530 in FIG. 5A and adjust the lightness of a second frame 1200-2 based on the input factor in accordance with operation 540 in FIG. 5A.

With reference to FIG. 5B (d), the processor 220 may synthesize the first frame 1100 and the second frame 1200-2 in accordance with operation 550 in FIG. 5A and display the synthesized frame 2000 on the display in accordance with operation 560 in FIG. 5A.

Figure 6A:
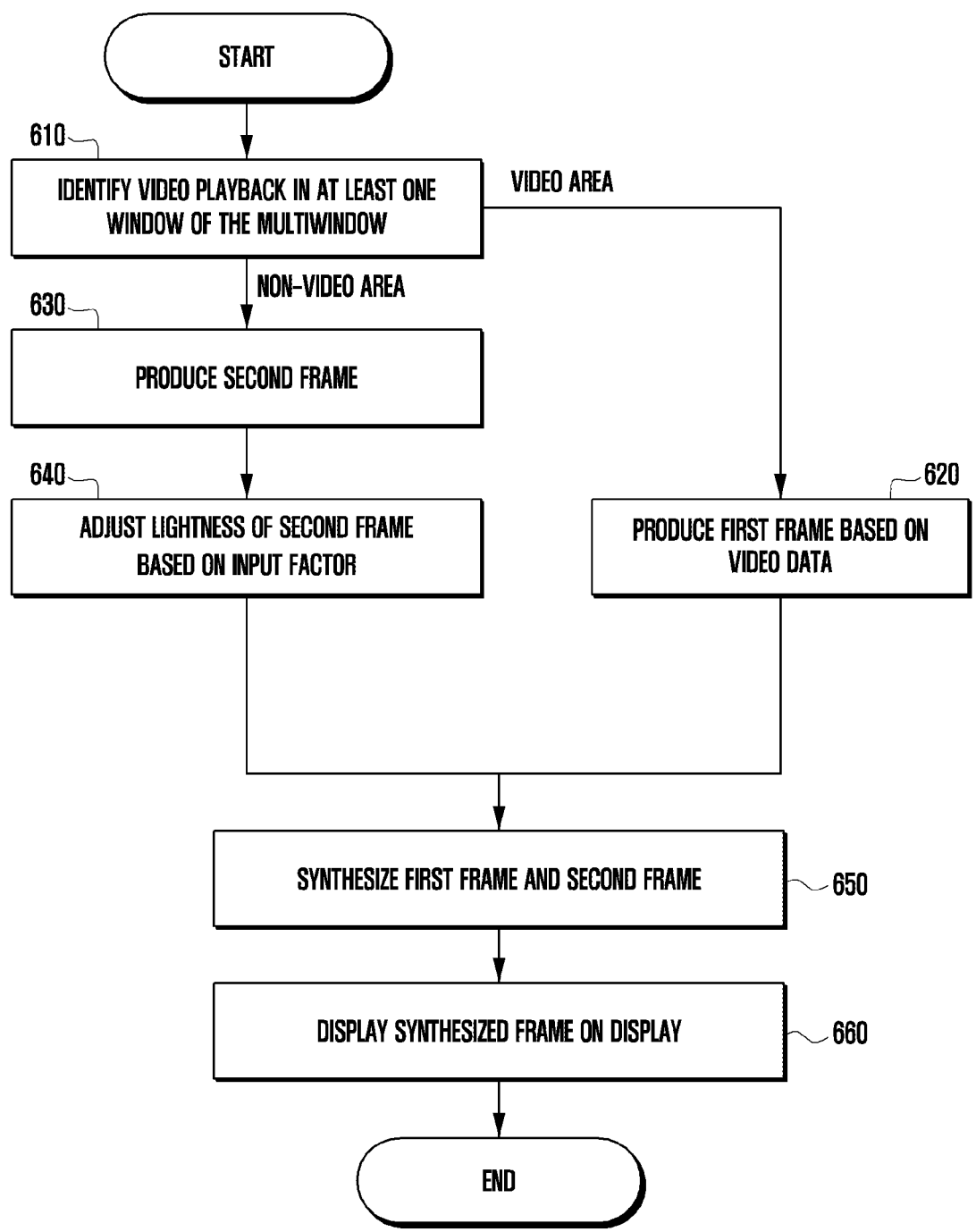
FIG. 6A is a flowchart illustrating an example method of producing, synthesizing, and displaying frames when the processor plays a video in a multiwindow according to various embodiments.

FIG. 6A is a flowchart illustrating an example method of producing, synthesizing, and displaying frames when the processor 220 plays a video in a multiwindow according to various embodiments.

The multiwindow may serve to display one or more applications on the display (e.g., the display in FIG. 2) by the processor 220 based on multitasking.

An operation in FIG. 6A according to various embodiments may be an operation performed by the processor 220 using the module included in the browser engine 300 illustrated in FIG. 3.

According to various embodiments, in operation 610, the processor 220 may identify that the video is played in at least one window of the multiwindow.

According to various embodiments, in operation 620, the processor 220 may produce the first frame 1100 based on the video data in respect to the window in which the video is played.

According to various embodiments, in operation 630, the processor 220 may produce the second frame 1200 in respect to a non-video window. For example, the non-video window may be a window of the multiwindow that does not play a video.

According to various embodiments, in operation 640, the processor 220 may adjust the lightness of the second frame 1200 based on the input factor.

According to an embodiment, the input factor may include at least one of content included in the window excluding a video, information indicating whether to enter a mode for maintaining screen brightness, information indicating external brightness, and a battery level.

According to an embodiment, the characteristics (e.g., the lightness) of the first frame 1100 may be maintained.

According to an embodiment, the processor 220 may adjust the lightness of the second frame 1200 by means of the VisCompositor module (e.g., the VizCompositor 360 in FIG. 3).

According to an embodiment, the processor 220 may adjust the lightness of the second frame 1200 by means of the VisCompositor module 360 while maintaining backlight brightness of the display 260.

According to an embodiment, the processor 220 may adjust the lightness of the second frame 1200 by adjusting the backlight brightness of the display 260 in the area of the second frame 1200.

A detailed description of operation 640 will be described in greater detail below with reference to FIG. 8.

According to various embodiments, in operation 650, the processor 220 may synthesize the first frame 1100 having the unchanged lightness and the second frame 1200 having the changed and determined lightness.

According to various embodiments, the processor 220 may synthesize the first frame 1100 and the second frame 1200 with the adjusted lightness. For example, the processor 220 may synthesize the first frame 1100 and the second frame 1200 using the openGL command.

According to various embodiments, in operation 660, the processor 220 may display the synthesized frame on the display.

According to various embodiments, the processor 220 may display the synthesized frame 2000 on the display (e.g., the display 260 in FIG. 2).

FIG. 6B is a diagram illustrating an example in which the processor 220 produces and synthesizes the frames and displays the synthesized frame on the display 260 when playing the video in the multiwindow according to various embodiments.

With reference to FIG. 6B (a), the processor 220 may produce the second frame 1200 in respect to the non-video window in operation 630 in FIG. 6A.

With reference to FIG. 6B (b), the processor 220 may adjust the lightness of the second frame 1200 based on the input factor in accordance with operation 640 in FIG. 6A.

With reference to FIG. 6B (c), the processor 220 may synthesize the first frame 1100 and the second frame 1200 in accordance with operation 650 in FIG. 6A and display the synthesized frame 2000 on the display in accordance with operation 660 in FIG. 6A.

Figure 7A:
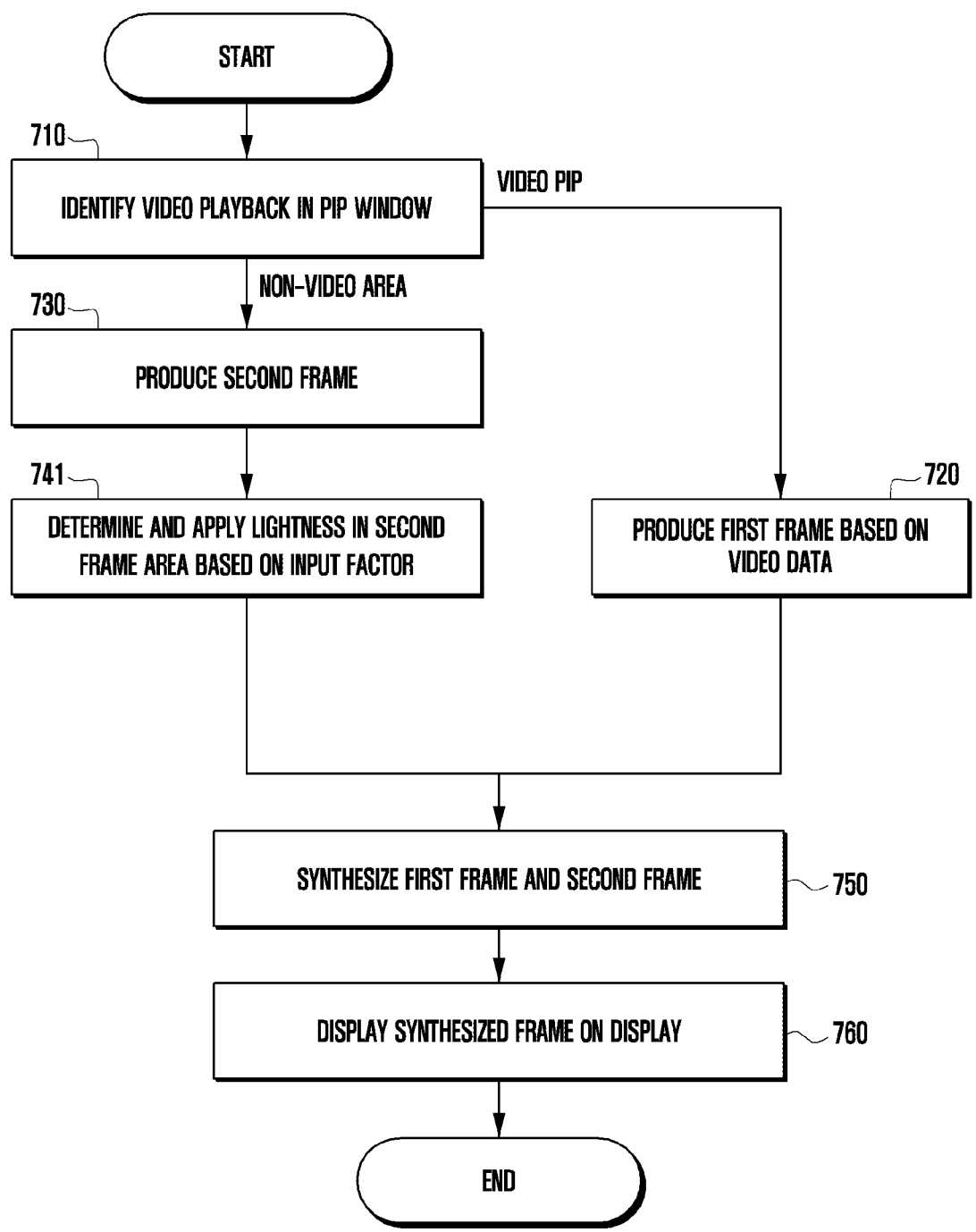
FIG. 7A is a flowchart illustrating an example method of producing, synthesizing, and displaying frames when the processor plays a video in a PIP window according to various embodiments.

FIG. 7A is a flowchart illustrating an example method of producing, synthesizing, and displaying frames when the processor 220 plays a video in a PIP window according to various embodiments.

An operation in FIG. 7A according to various embodiments may be an operation performed by the processor 220 using the module included in the browser engine 300 illustrated in FIG. 3.

According to various embodiments, in operation 710, the processor 220 may identify that the video is played in the PIP window.

According to various embodiments, in operation 720, the processor 220 may produce the first frame 1100 in respect to the video PIP.

According to various embodiments, in operation 730, the processor 220 may produce the second frame 1200 in respect to a non-video PIP window.

According to various embodiments, in operation 741, the processor 220 may adjust the lightness of the second frame 1200 based on the input factor.

According to an embodiment, the input factor may include at least one of webpage content, information indicating whether to enter a mode for maintaining screen brightness, information indicating external brightness, and a battery level.

According to an embodiment, the characteristics (e.g., the lightness) of the first frame 1100 may be maintained.

According to an embodiment, the processor 220 may adjust the lightness of the second frame 1200 by means of the VisCompositor module (e.g., the VizCompositor 360 in FIG. 3).

According to an embodiment, the processor 220 may adjust the lightness of the second frame 1200 by means of the VisCompositor module 360 while maintaining backlight brightness of the display 260.

According to an embodiment, the processor 220 may adjust the lightness of the second frame 1200 by adjusting the backlight brightness of the display 260 in the area of the second frame 1200.

A detailed description of operation 741 will be described in greater detail below with reference to FIG. 8.

According to various embodiments, in operation 750, the processor 220 may synthesize the first frame 1100 and the second frame 1200.

According to various embodiments, the processor 220 may synthesize the first frame 1100 and the second frame 1200 with the adjusted lightness. For example, the processor 220 may synthesize the first frame 1100 and the second frame 1200 using the openGL command.

According to various embodiments, in operation 760, the processor 220 may display the synthesized frame 2000 on the display.

Figure 7B:
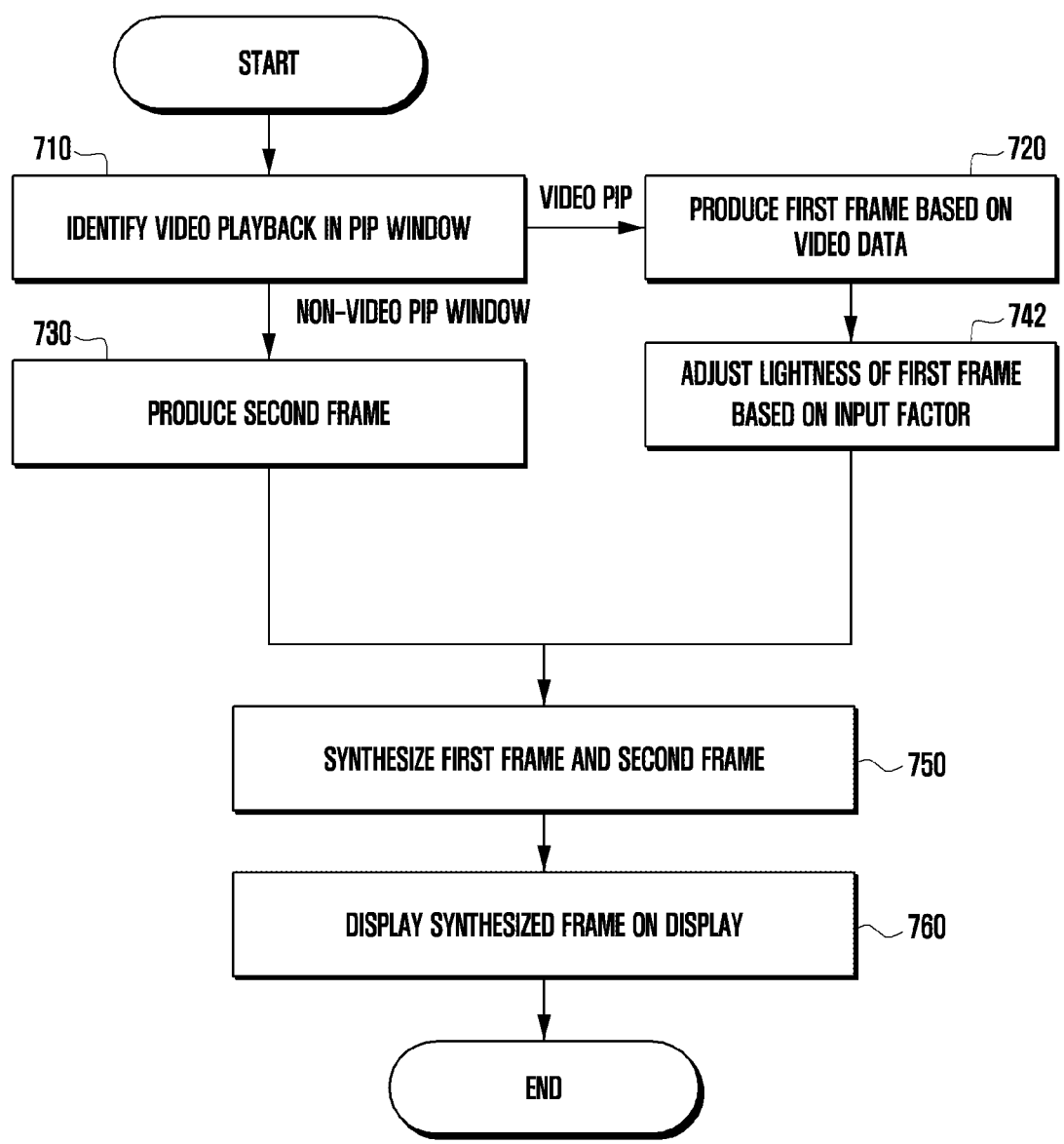
FIG. 7B is a flowchart illustrating an example method of producing, synthesizing, and displaying the frames when the plays the video in the PIP window processor according to various embodiments.

FIG. 7B is a flowchart illustrating an example method of producing, synthesizing, and displaying frames when the processor 220 plays a video in the PIP window according to various embodiments.

FIG. 7B may be an example that adjusts the lightness of the frame corresponding to the video area (e.g., the first area). The first area may be an area including a video, and the second area may be another area not including the area including the video.

An operation in FIG. 7B according to various embodiments may be an operation performed by the processor 220 using the module included in the browser engine 300 illustrated in FIG. 3.

According to various embodiments, in operation 710, the processor 220 may identify that the video is played in the PIP window.

According to various embodiments, in operation 720, the processor 220 may produce the first frame 1100 in respect to the video PIP.

According to various embodiments, in operation 742, the processor 220 may adjust the lightness of the first frame 1100 based on the input factor.

According to an embodiment, the input factor may include at least one of webpage content, information indicating whether to enter a mode for maintaining screen brightness, information indicating external brightness, and a battery level.

According to an embodiment, the characteristics (e.g., the lightness) of the second frame 1200 may be maintained.

According to an embodiment, the processor 220 may adjust the lightness of the first frame 1100 by means of the VisCompositor module (e.g., the VizCompositor 360 in FIG. 3).

According to an embodiment, the processor 220 may adjust the lightness of the second frame 1200 by means of the VisCompositor module 360 while maintaining backlight brightness of the display 260.

According to an embodiment, the processor 220 may adjust the lightness of the second frame 1200 by adjusting the backlight brightness of the display 260 in the area of the second frame 1200.

According to an embodiment, the processor 220 may adjust the lightness of the first frame 1100 based on at least one of webpage content, screen brightness setting, external brightness, and a battery level.

A detailed description of operation 742 will be described in greater detail below with reference to FIG. 8.

According to various embodiments, in operation 730, the processor 220 may produce the second frame 1200 in respect to a non-video PIP window.

The non-video window may be a window of the multi-window that does not play a video.

According to various embodiments, in operation 750, the processor 220 may synthesize the first frame 1100 and the second frame 1200.

According to various embodiments, the processor 220 may synthesize the first frame 1100 with the adjusted lightness and the second frame 1200. For example, the processor 220 may synthesize the first frame 1100 and the second frame 1200 using the openGL command.

According to various embodiments, in operation 760, the processor 220 may display the synthesized frame 2000 on the display.

Figure 7C:
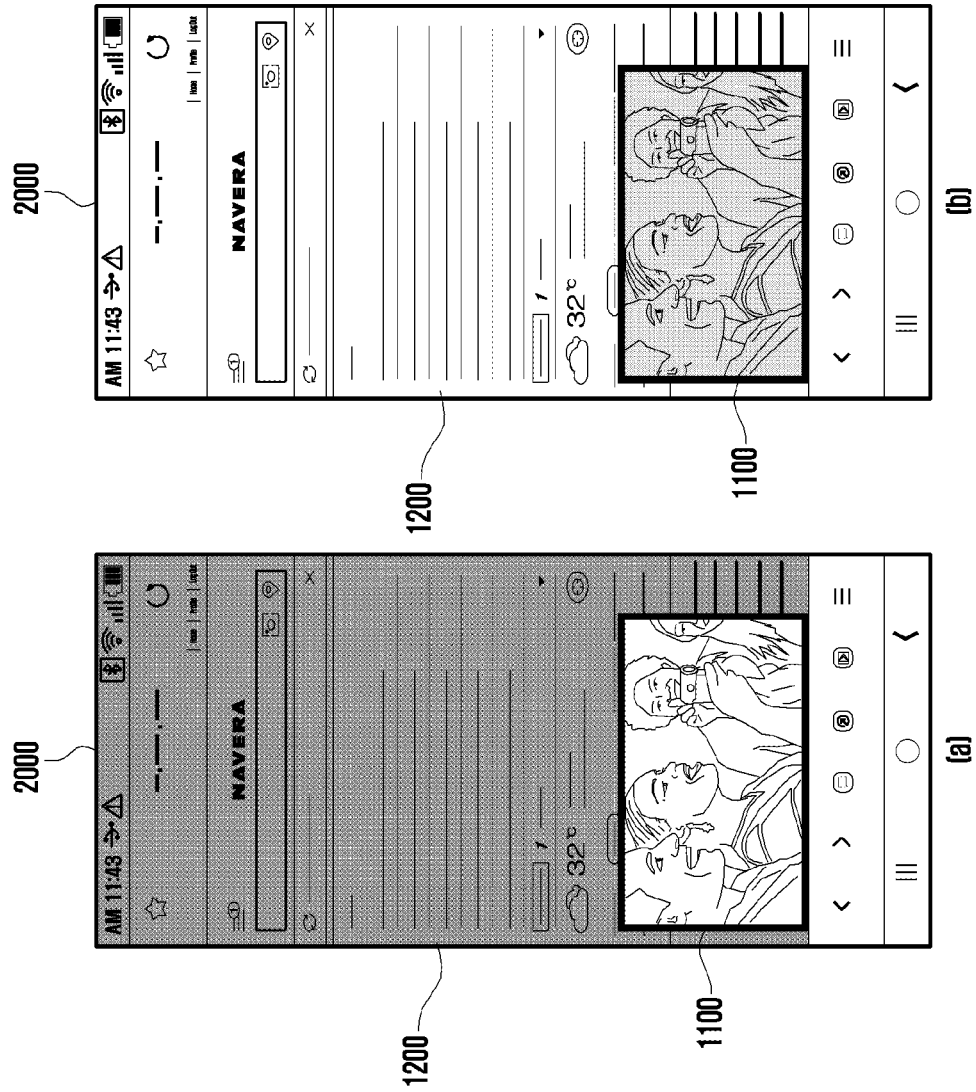
FIG. 7C is a diagram illustrating an example in which the processor produces, synthesizes, and displays the frames when playing the video in the PIP window according to various embodiments.

FIG. 7C is a diagram illustrating an example in which the processor 220 produces, synthesizes, and displays the frames when playing the video in the PIP window according to various embodiments.

With reference to FIG. 7C (a), the processor 220 may produce the first frame 1100 in respect to the video PIP in accordance with operation 720 in FIG. 7A, produce the second frame 1200 in respect to the non-video PIP window in accordance with operation 730 in FIG. 7A, adjust the lightness of the second frame 1200 based on the input factor in accordance with operation 741 in FIG. 7A, synthesize the first frame 1100 and the second frame 1200 with the adjusted lightness in accordance with operation 750 in FIG. 7A, and display the synthesized frame 2000 on the display in accordance with operation 760 in FIG. 7A.

With reference to FIG. 7C (b), the processor 220 may produce the first frame 1100 in respect to the video PIP in accordance with operation 720 in FIG. 7B, produce the second frame 1200 in respect to the non-video PIP window in accordance with operation 730 in FIG. 7B, adjust the lightness of the first frame 1100 based on the input factor in accordance with operation 742 in FIG. 7B, synthesize the first frame 1100 with the adjusted lightness and the second frame 1200 in accordance with operation 750 in FIG. 7B, and display the synthesized frame 2000 on the display in accordance with operation 760 in FIG. 7B.

Figure 8:
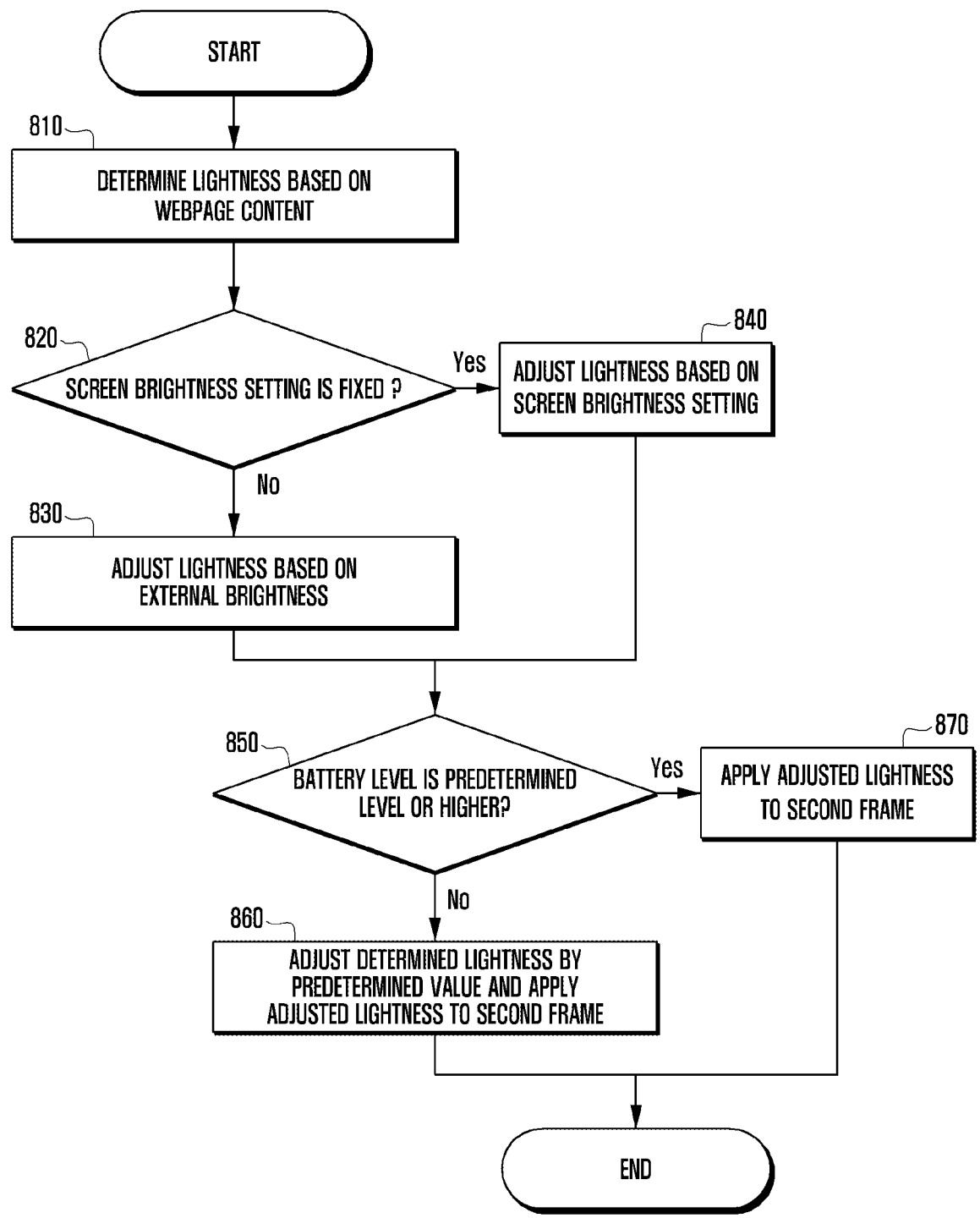
FIG. 8 is a flowchart illustrating an example method of adjusting lightness of a second frame based on an input factor by the processor according to various embodiments.

FIG. 8 is a flowchart illustrating an example method of adjusting lightness of the second frame based on the input factor by the processor according to various embodiments.

According to an embodiment, the input factor may include at least one of webpage content, information indicating whether to enter a mode for maintaining screen brightness, information indicating external brightness, and a battery level.

FIG. 8 illustrates various details of operation 430 in FIG. 4, operation 540 in FIG. 5A, operation 640 in FIG. 6A, operation 740 in FIG. 7A, or operation 725 in FIG. 7B.

According to various embodiments, the processor 220 may adjust the lightness of the second frame 1200 by means of the VisCompositor module (e.g., the VizCompositor 360 in FIG. 3).

According to an embodiment, the processor 220 may adjust the lightness of the second frame 1200 by means of the VisCompositor module 360 while maintaining backlight brightness of the display 260.

According to an embodiment, the processor 220 may adjust the lightness of the second frame 1200 by adjusting the backlight brightness of the display 260 in the area of the second frame 1200.

In operation 810, the processor according to various embodiments may determine the lightness based on webpage content.

According to an embodiment, the input factor may include at least one of a first element, a second element, and a third element. For example, the first element may be a value corresponding to a color and/or lightness of an image included in the second frame. For example, the second element may be a value corresponding to a color, number, and/or size of a letter included in the second frame. For example, the third element may be a value corresponding to a background color of the second frame.

For example, the processor may determine the lightness by configuring a first weight value for the first element, a second weight value for the second element, and/or a third weight value for the third element.

In operation 820, the processor according to various embodiments may identify whether the screen brightness setting is fixed.

In operation 830, the processor according to various embodiments may adjust the lightness based on the external brightness while corresponding to the situation in which the screen brightness setting is not fixed.

According to an embodiment, the processor may measure brightness of a space, in which the electronic device is positioned, using the sensor module (e.g., the sensor module 176 in FIG. 1) for measuring the external brightness, and adjust the lightness based on the measured external brightness. For example, the processor may decrease a degree of adjustment of lightness as the external brightness becomes higher. For example, the processor may increase the degree of adjustment of lightness as the external brightness becomes lower.

In operation 840, the processor according to various embodiments may adjust the lightness based on the screen brightness setting while corresponding to the situation in which the screen brightness setting is fixed.

For example, the processor may increase the degree of adjustment of lightness as the screen brightness setting is brightened. For example, the processor may decrease the degree of adjustment of lightness as the screen brightness setting is darkened.

In operation 850, the processor according to various embodiments may identify whether the battery level is a predetermined (e.g., specified) level or higher.

When the battery level is lower than the predetermined level (e.g., by about 15%), the processor according to various embodiments may adjust the lightness by a predetermined (e.g., specified) degree (e.g., about 30%) and apply the adjusted lightness to the second frame, in operation 860.

When the battery level is the predetermined level or higher, the processor according to various embodiments may apply the adjusted lightness to the second frame, in operation 870.

Figure 9:
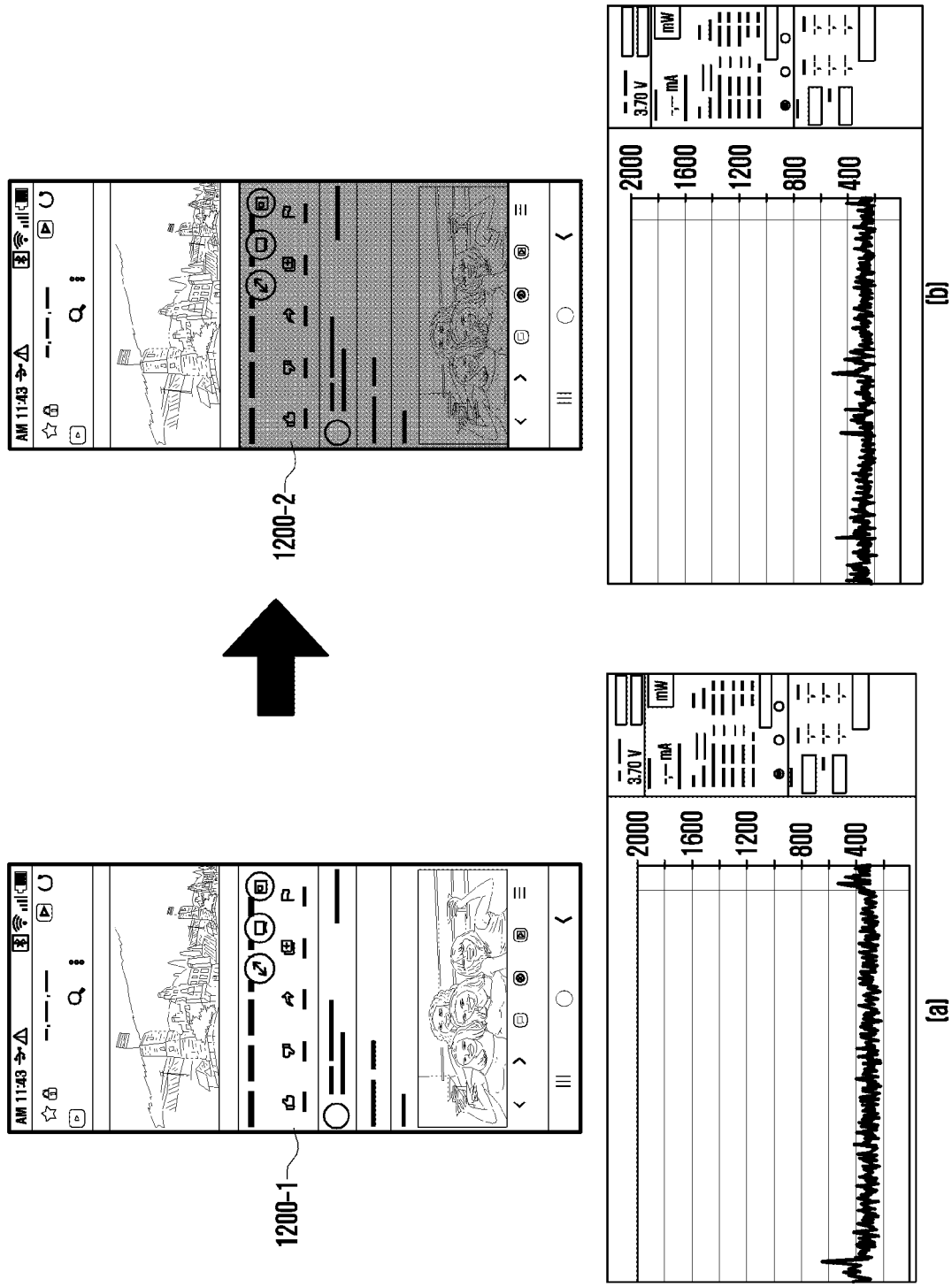
FIG. 9 is a diagram illustrating an effect obtained by adjusting the lightness of the second frame by the processor according to various embodiments.

FIG. 9 is a diagram including graphs illustrating an effect obtained by adjusting the lightness of the second frame 1200 by the processor (e.g., the processor 220 in FIG. 2) according to various embodiments.

The upper end of FIG. 9 (a) illustrates the second frame 1200—having the lightness that is not adjusted, and the lower end of FIG. 9 (a) is a graph illustrating the amount of current consumption when the lightness in respect to the second frame 1200 is not adjusted.

The upper end of FIG. 9 (b) illustrates the second frame 1200 having the adjusted lightness, and the lower end of FIG. 9 (b) is a graph illustrating the amount of current consumption when the lightness in respect to the second frame 1200 is adjusted.

With reference to FIG. 9 (a) and FIG. 9 (b), it can be seen that the amount of current consumption decreases (e.g., by about 30 mA) in case that the processor 220 adjusts the lightness in respect to the second frame 1200 in comparison with the case that the processor 220 does not adjust the lightness.

The electronic device according to various example embodiments includes: a display and a processor. The processor may be configured to: identify a first area of a screen in which a video is played, produce a first frame corresponding to the first area, produce a second frame a corresponding to a second area different from the first area, determine a lightness of the second frame a based on an input factor related to a state of the electronic device, synthesize the first frame a having an unchanged lightness and the second frame having a changed and determined lightness, and control the display to display the synthesized frame on the display.

In the electronic device according to various example embodiments, the processor may be configured to determine the lightness of the second frame while controlling the display to maintain a backlight brightness of the display.

In the electronic device according to various example embodiments, the input factor includes at least one of a first element corresponding to a color and/or lightness of the image included in the second frame, a second element corresponding to a color, number, and size of a letter included in the second frame, and the third element corresponding to a background color of the second frame. The processor may be configured to determine the lightness of the second frame by applying weight values to the first element, the second element, and the third element.

In the electronic device according to various example embodiments, the input factor includes information indicating whether to enter a mode for maintaining screen brightness of the display, information indicating a configured screen brightness of the display, and information indicating external brightness. The processor may be configured to determine the lightness of the second frame based on the configured screen brightness of the display based on the mode for maintaining the screen brightness of the display being performed, and the processor may be configured to determine the lightness of the second frame based on the external brightness based on the mode for maintaining the screen brightness of the display not being performed.

In the electronic device according to various example embodiments, the processor may be configured to increase a degree of adjustment of lightness as the configured screen brightness of the display becomes higher, decrease the degree of adjustment of lightness as the configured screen brightness of the display becomes lower, decrease the degree of adjustment of lightness as the external brightness becomes higher, and increase the degree of adjustment of lightness as the external brightness becomes lower.

In the electronic device according to various example embodiments, the input factor may include the battery level of the electronic device, and the processor may be configured to determine to decrease the lightness of the second frame by a specified value based on the battery level being less than a specified value.

In the electronic device according to various example embodiments, the processor may be configured to identify the video playback on the webpage, the first frame may correspond to the first area on the webpage, and the second frame may correspond to the second area on the webpage.

In the electronic device according to various example embodiments, the processor may be configured to identify video playback in at least one window of a multiwindow, the first frame may correspond to the window corresponding to the first area, and the second frame may correspond to the window corresponding to the second area.

In the electronic device according to various example embodiments, the processor may be configured to identify video playback in a PIP (picture-in-picture) pop-up, the first frame may correspond to the pop-up corresponding to the first area, and the second frame may correspond to the second area.

In the electronic device according to various example embodiments, the processor may be configured to identify video playback in the PIP (picture-in-picture) pop-up, the first frame may correspond to the second area, and the second frame may correspond to a pop-up window corresponding to the first area.

A method of operating the electronic device according to various example embodiments may include: identifying a first area of the screen in which the video is played, producing a first frame corresponding to the first area, producing a second frame corresponding to a second area different from the first area, determining a lightness of the second frame based on an input factor related to the state of the electronic device, synthesizing the first frame and the second frame, and displaying the synthesized frame on a display.

The method of operating the electronic device according to various example embodiments may include determining the lightness of the second frame while controlling the display to maintain a backlight brightness of the display.

In the method of operating the electronic device according to various example embodiments, the input factor may include at least one of a first element corresponding to a color and/or lightness of the image included in the second frame, a second element corresponding to a color, number, and size of a letter included in the second frame, and a third element corresponding to a background color of the second frame a, and the method may include determining the lightness of the second frame by applying weight values to the first element, the second element, and the third element.

In the method of operating the electronic device 200 according to various example embodiments, the input factor may include information indicating whether to enter a mode for maintaining screen brightness of the display, information indicating the configured screen brightness of the display, and information indicating external brightness, and the method may include determining the lightness of the second frame based on the configured screen brightness of the display based on the mode for maintaining the screen brightness of the display being performed, and determining the lightness of the second frame based on the external brightness based on the mode for maintaining the screen brightness of the display not being performed.

In the method of operating the electronic device according to various example embodiments, the determining the lightness of the second frame based on the configured screen brightness of the display may include increasing the degree of adjustment of lightness as the configured screen brightness of the display becomes higher, and decreasing the degree of adjustment of lightness as the configured screen brightness of the display becomes lower, and the determining the lightness of the second frame based on the external brightness may include decreasing the degree of adjustment of lightness as the external brightness becomes higher, and increasing the degree of adjustment of lightness as the external brightness becomes lower.

In the method of operating the electronic device according to various example embodiments, the input factor may include a battery level of the electronic device, and the method may include determining to decrease the lightness of the second frame by a specified value based on the battery level being less than a specified value.

In the method of operating the electronic device according to various example embodiments, the identifying the video playback in a partial area of the screen may include identifying video playback on a webpage, the first frame may correspond to the first area on the webpage, and the second frame may correspond to the second area on the webpage.

In the method of operating the electronic device according to various example embodiments, the identifying the video playback in the partial area of the screen may include identifying the video playback in at least one window of a multiwindow, the first frame may correspond to the window corresponding to the first area, and the second frame may correspond to the window corresponding to the second area.

In the method of operating the electronic device according to various example embodiments, the identifying the video playback in the partial area of the screen may include identifying the video playback in a PIP (picture-in-picture) pop-up, the first frame may correspond to the pop-up corresponding to the first area, and the second frame may correspond to the second area.

In the method of operating the electronic device according to various example embodiments, the identifying the video playback in the partial area of the screen may include identifying the video playback in the PIP (picture-in-picture) pop-up, the first frame may correspond to the second area, and the second frame may correspond to the pop-up corresponding to the first area.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a display;
a processor; and
memory storing instructions, being executable by the processor, that cause the electronic device to:
identify, when playing a video in a screen displayed on the display, a first area in which the video is played and a second area which is a remaining area of the screen except for the first area,
determine a lightness to be applied to a frame corresponding to the second area based on a factor related to a state of the electronic device, and
control the display to display the screen by applying the determined lightness to the frame while maintaining a lightness of the first area.

2. The electronic device of claim 1, wherein the memory includes instructions which cause the electronic device to: determine the lightness of the frame while controlling the display to maintain backlight brightness of the display.

3. The electronic device of claim 1, wherein the factor comprises at least one of a first element corresponding to a color and/or lightness of an image included in the frame, a second element corresponding to a color, number, and size of a letter included in the frame, or a third element corresponding to a background color of the frame, and
wherein the memory includes instructions which cause the electronic device to determine the lightness of the frame by applying weight values to the at least one of the first element, the second element, or the third element.

4. The electronic device of claim 1, wherein the factor comprises information indicating whether to enter a mode for maintaining screen brightness of the display, information indicating a configured screen brightness of the display, and information indicating external brightness,
wherein the memory includes instructions which cause the electronic device to:

determine the lightness of the frame based on the configured screen brightness of the display, based on the mode for maintaining the screen brightness of the display being performed, and determine the lightness of the frame based on the external brightness, based on the mode for maintaining the screen brightness of the display not being performed.

5. The electronic device of claim 4, wherein the memory includes instructions which cause the electronic device to:

increase a degree of adjustment of lightness as the configured screen brightness of the display becomes higher, decrease the degree of adjustment of lightness as the configured screen brightness of the display becomes lower, decrease the degree of adjustment of lightness as the external brightness becomes higher, and increase the degree of adjustment of lightness as the external brightness becomes lower.

6. The electronic device of claim 1, wherein the input factor comprises a battery level of the electronic device, and the memory includes instructions which cause the electronic device to determine to decrease the lightness of the frame by a specified value based on the battery level being less than a specified value.

7. The electronic device of claim 1, wherein the screen comprises on a webpage screen.

8. The electronic device of claim 1, wherein the memory includes instructions which cause the electronic device to identify a video playback in at least one window of a multiwindow, the first area corresponds to a window in which the video is played, and the second area corresponds to another window.

9. The electronic device of claim 1, wherein the memory includes instructions which cause the electronic device to identify a video playback in a PIP (picture-in-picture) pop-up, and the first area corresponds to a pop up.

10. The electronic device of claim 1, wherein the memory includes instructions which cause the electronic device to identify a video playback in a PIP (picture-in-picture) pop-up, and the frame corresponds to a pop-up window.

11. A method of operating an electronic device, the method comprising:

identifying, when playing a video in a screen displayed on the display, a first area in which a video is played and a second area which is a remaining area of the screen except for the first area;

determining a lightness to be applied to a frame corresponding to the second area based on a factor related to a state of the electronic device; and displaying the screen by applying the determined lightness to the frame while maintaining a lightness of the first area.

12. The method of claim 11, comprising:

determining the lightness of the frame while controlling the display to maintain a backlight brightness of the display.

13. The method of claim 11, wherein the factor comprises at least one of a first element corresponding to a color and/or lightness of an image included in the frame, a second element corresponding to a color, number, and size of a letter included in the frame, or a third element corresponding to a background color of the frame, and wherein the method further comprises determining the lightness of the frame by applying weight values to the at least one of the first element, the second element, or the third element.

14. The method of claim 11, wherein the factor comprises information indicating whether to enter a mode for maintaining screen brightness of the display, information indicating a configured screen brightness of the display, and information indicating external brightness, and wherein the method further comprises:

determining the lightness of the frame based on the configured screen brightness of the display, based on the mode for maintaining the screen brightness of the display being performed; and determining the lightness of the frame based on the external brightness, based on the mode for maintaining the screen brightness of the display not being performed.

15. The method of claim 14, wherein the determining the lightness of the frame based on the configured screen brightness of the display comprises:

increasing a degree of adjustment of lightness as the configured screen brightness of the display becomes higher; and decreasing the degree of adjustment of lightness as the configured screen brightness of the display becomes lower, and wherein the determining the lightness of the frame based on the external brightness comprises:

decreasing the degree of adjustment of lightness as the external brightness becomes higher; and increasing the degree of adjustment of lightness as the external brightness becomes lower.

16. The method of claim 11, wherein the factor comprises a battery level of the electronic device, and the method further comprises determining to decrease the lightness of the frame by a specified value based on the battery level being less than a specified value.

17. The method of claim 11, wherein the screen comprises a webpage screen.

18. The method of claim 11, wherein the identifying the first area in which the video is played in the screen comprises identifying a video playback in at least one window of a multiwindow, the first area corresponds to a window in which the video is played, and the second area corresponds to another window.

19. The method of claim 11, wherein the identifying the first area in which the video is played in the screen comprises identifying a video playback in a PIP (picture-in-picture) pop-up, the first area corresponds to a pop up.

20. The method of claim 11, wherein the identifying the first area in which the video is played in the screen comprises identifying a video playback in a PIP (picture-in-picture) pop-up, and the frame corresponds to a pop up.

* * * * *